No. 892,936. PATENTED JULY 7, 1908.
M. R. COLE.
END GATE FASTENER.
APPLICATION FILED JULY 19, 1907.

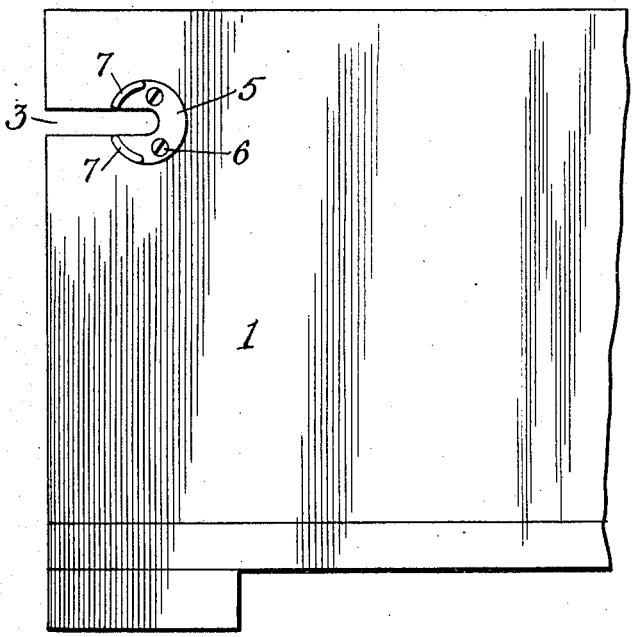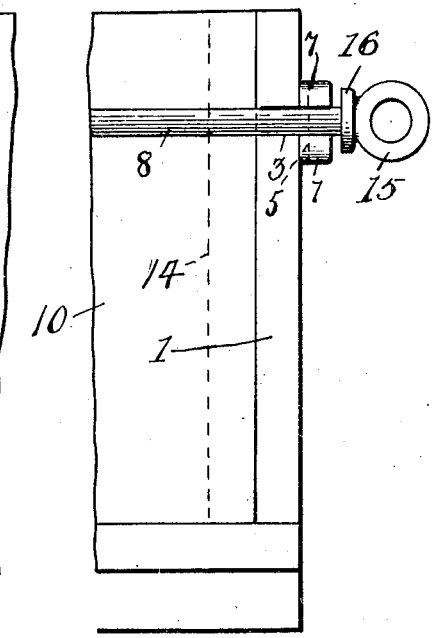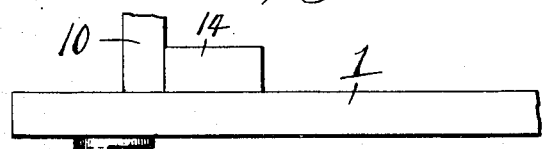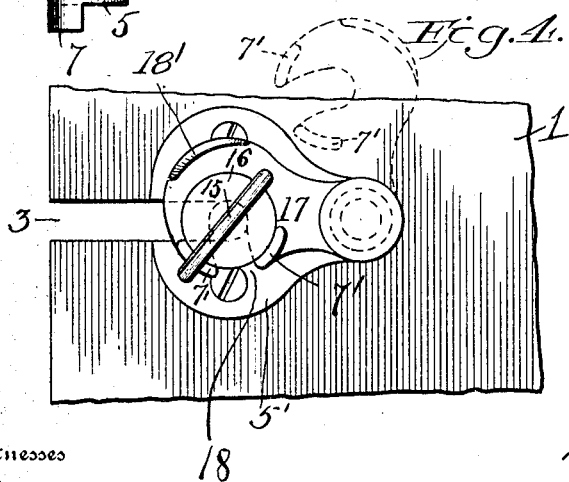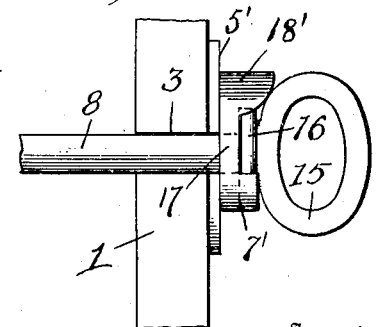

2 SHEETS—SHEET 2.

Witnesses
C. N. Walker

Inventor
Melville R. Cole
By Clem F. Kimball
Attorney

UNITED STATES PATENT OFFICE.

MELVILLE R. COLE, OF SHENANDOAH, IOWA, ASSIGNOR TO STANDARD MANUFACTURING COMPANY, OF COUNCIL BLUFFS, IOWA.

END-GATE FASTENER.

No. 892,936.      Specification of Letters Patent.      Patented July 7, 1908.

Application filed July 19, 1907. Serial No. 384,650.

*To all whom it may concern:*

Be it known that I, MELVILLE R. COLE, a citizen of the United States, residing at Shenandoah, in the county of Page and State of Iowa, have invented a new and useful End-Gate Fastener, of which the following is a specification.

This invention relates to end gate fasteners.

One object is to provide an end gate fastener embodying one or more rods in combination with means for holding the rod or rods against accidental displacement and thereby insure an efficient fastening of the end gate.

Another object of the invention resides in the provision of an end gate fastener constructed and arranged whereby the end gate may be quickly and efficiently locked in place and easily removed by proper manipulation of the fastening means.

With the above and other objects in view, the present invention consists in the combination and arrangement of parts hereinafter more fully described, illustrated in the accompanying drawings and particularly pointed out in the appended claims, it being understood that changes may be made in the form, proportion, size and minor details without departing from the spirit or sacrificing any of the advantages thereof.

Figure 6:
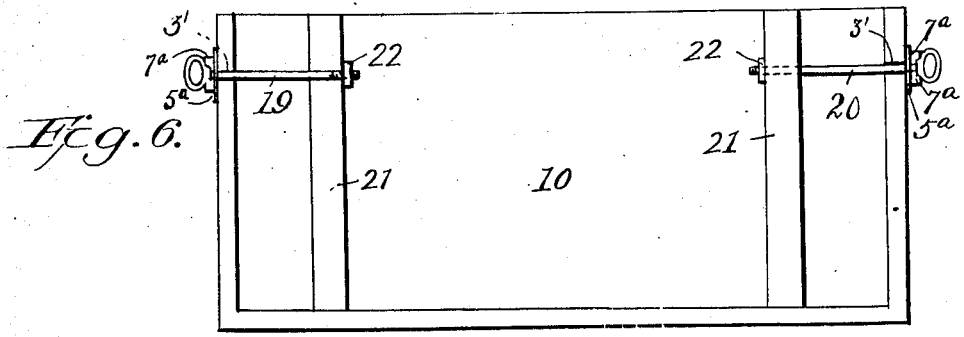
Figure 7:
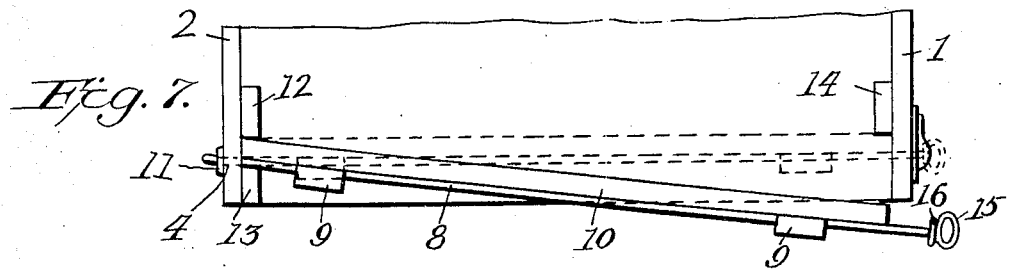
Figure 8:
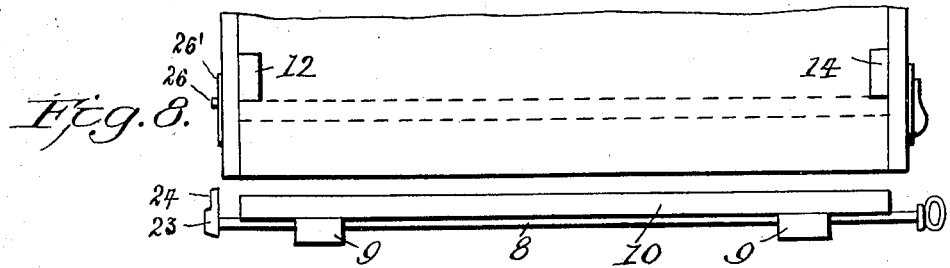
Figures 9, 10:
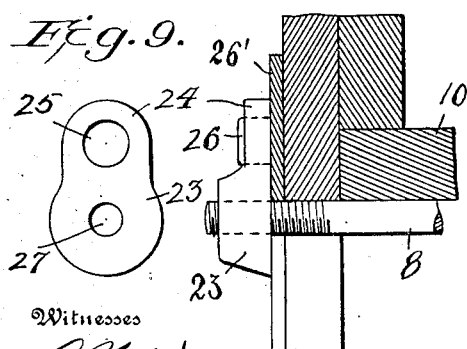
Figures 11, 12:
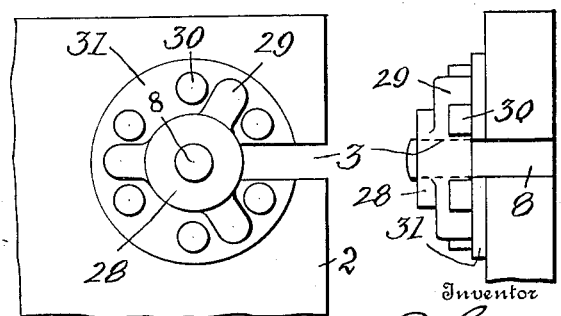

In the drawings:—Figure 1 is a side elevation of a portion of the side of a wagon box illustrating a portion of my fastening means. Fig. 2 is a plan view of Fig. 1. Fig. 3 is a rear view of a portion of a wagon box illustrating the fastening rod partially out of operation. Fig. 4 is a side elevation of a portion of a wagon box illustrating another form of my invention. Fig. 5 is an end view of the modified type of invention shown in Fig. 4. Fig. 6 is an end elevation of a wagon box showing another method of application of my invention. Fig. 7 is a plan view of the end portion of a wagon box illustrating the application of the invention in connection with a single rod. Fig. 8 is a view similar to Fig. 7, showing the end gate rod and end gate detached and also illustrating a modified form of nut. Fig. 9 is a side elevation enlarged of said modified form of nut. Fig. 10 is a cross sectional view enlarged of a portion of a wagon box and end gate illustrating the end gate rod of the first type of invention in combination with the aforesaid modified form of nut. Figs. 11 and 12 are elevations of another form of nut used with my invention.

Referring now to the accompanying drawings and more particularly to Figs. 1 to 3, inclusive, and Fig. 7, the reference characters 1 and 2 indicate sides of a wagon box, the side 1 being provided with a slot 3 near its top and the side 2 with a perforation 4.

Embracing the rear end of the slot 3 is a slotted plate 5, whose slot alines with the slot 3. This plate 5 is secured in place by means of screws 6, or in any other suitable manner and is provided with oppositely disposed lugs 7 for a purpose presently explained.

The reference character 8 indicates a fastening rod which is preferably passed through alining perforations in the cleats 9 of the end gate 10 with its threaded end passed through the aforesaid perforation 4 of the side 2 for screw threaded engagement in the nut 11 arranged adjacent the outer face of the side 2. As shown in Fig. 7, the inner and outer cleats 12 and 13, respectively, are employed as usual in connection with the side 2 of the box, but on the opposite side of the box, the outermost cleat is not employed although the innermost stop cleat 14 is employed, and to secure the end gate in place and lock it in accordance with this particular type of fastener, the parts are positioned as shown in full lines in Fig. 7, when the end gate may be forced to the position shown in dotted lines, resulting in the rod 8 being forced into the slot 3 of the side 1 of the box to the end of said slot when the loop 15 may be grasped and the rod 8 screwed into the nut 11 until the hub 16 of the loop 15 engages the face of the plate 5, and in the rear of the ribs 7—7, and thereby be so arranged with respect to the lugs 7 as to prevent accidental outward movement of the fastening rod 8 and end gate 10. To remove the end gate it would be only necessary to turn the loop 15 in the opposite direction until the hub 16 is clear of the ribs 7, thereby permitting ready withdrawal of the end gate.

In Figs. 4 and 5 I illustrate a modified form of means for locking the rod 8 against accidental unscrewing, all of the features of this modified form of invention being the same as that hereinbefore described, except that I pivot to a plate 5′ corresponding to the plate 5 a hook 17 provided with a slot 18 adapted to embrace the rod 8 with lugs 7′ formed upon the hook 17 and corresponding to the lugs 7, instead of upon the plate 5′. This hook 17 is provided with a thumb lip 18′ to permit of a ready lifting or lowering of the hook 17 into and out of operative position. When the rod 8 is screwed into position it will tighten against the plate 5′ and be partially inclosed by the lugs 7′ of the pivoted hook 17.

In Fig. 6 I illustrate a construction wherein two rods 19 and 20 may be employed in lieu of the single rod fastening. In this third form of invention each rod 19 and 20 is passed through a perforation in the corresponding cleat 21 of the end gate 10 into coöperative engagement with a nut 22. Both sides of the wagon body in this form are provided with slots 3′ corresponding to the slot 3, as shown in Fig. 1, so that the outer end of each rod may have the same form and fastening connections as illustrated in Figs. 1 to 3, inclusive, and 7. In this third form of invention the outermost cleat 13 is not employed so that the end gate may slip into position, as may be understood by reference to Fig. 8, by pushing the end gate in to the wagon box against the innermost cleats 12 and 14.

From the foregoing, it will be understood that the forms of inventions shown in Figs. 1 to 3, inclusive, and Fig. 7, are substantially the same as the form illustrated in Fig. 6, except that in the latter form two fastening rods are used instead of one. When only one rod is used, the rod is unscrewed with relation to its nut so that the rod may be partially withdrawn through the cleats 9 upon the end gate, as shown in Fig. 7. The rod is then passed through the slot 3 and the end gate is readily pushed into or out of position, while in the form wherein two rods are employed, the same manipulation is followed, except that it is necessary only to partially unscrew the rods 19 and 20 on either side of the projections 7ᵃ of the plates 5ᵃ to permit of the insertion or withdrawal of the end gate. To catch and hold the end gate without screwing up either the single or the two rods, the pivoted hook 17 may be employed, and when it is employed, the rod or rods may be inserted in the corresponding slots of the body of the box, while the pivoted hook is lifted and then dropped over the rods.

In Figs. 8, 9 and 10, I illustrate substantially the same invention as that hereinbefore described, except that I provide a modified form of nut 23 with an extension 24 provided with a perforation 25 adapted to fit over a projection 26 on a plate 26′ and thus lock the nut against movement during the screwing or unscrewing of the fastening rod into the screw threaded perforation 27 of the nut.

In Figs. 11 and 12 I illustrate a form of fastening nut differing from the forms of nuts hereinbefore described. In this last form of invention, both sides of the body are provided with slots 3 and a nut 28 is provided with radial fingers 29 adapted to engage between projections 30 of a plate 31, so that when the fastening rod is screwed into the nut 28 it will cause the fingers 29 of the latter to draw in between the projections 30 and withdraw from between the latter when the rod is unscrewed, so that the rod and end gate may be readily slipped into and out of the end of the wagon box.

What is claimed is:—

1. In an end gate fastener, the combination with a vehicle body including spaced sides and an end gate, one of said sides having a transverse aperture and the other side having an open slot, of a plate provided with an aperture registering with the aperture in said body side and with a stud spaced from the aperture therein, a nut with its threaded aperture in alinement with said registering apertures, and with an apertured projection bearing over said stud, a rod passing at one end through said body side and plate aperture and threaded to engage said nut and adapted to engage said open body slot and bearing against said end gate, and means for locking said rod in said slot.

2. In an end gate fastener, the combination with a vehicle body including spaced sides and an end gate, one of said sides having a transverse aperture and the other side having an open slot, of a hook element swinging from the body side having the slot, with the opening of the hook adapted to register at its inner end with the inner end of said open body slot when in one position and provided with segmental ribs, a rod threaded at one end with a collar at the other end and adapted to have its threaded end passed through the body side aperture, and a nut engaging the threaded end of the rod, said hook element adapted to bear over the rod between the rod collar and adjacent body side and said collar adapted to bear against said hook element and in the rear of the ribs thereof when the rod is engaged with said nut.

3. In an end gate fastener, the combination with a vehicle body including spaced sides and an end gate, one of said sides having a transverse aperture and the other side having an open slot, of a plate upon said slotted body side and having an open slot registering with the body slot, a hook element swinging from said plate, with the opening of the hook adapted to register at its inner end with the inner end of said open body slot when in one position and provided with segmental ribs, a rod threaded at one end and with a collar at the other end and adapted to have its threaded end passed through the body side aperture, and a nut engaging the threaded end of the rod, said hook element adapted to engage the rod between the collar and plate.

4. In an end gate fastener, the combination with a vehicle body including spaced sides and an end gate, one of said sides having an open slot, of a plate secured to the slotted side of said body and having an open slot registering with the aforesaid slot, a hook member pivoted upon said plate and having projecting ribs, a rod having removable connection with the side opposite the slotted side of said body and also adapted for movement into and out of said registering slots, said hook engaging the rod when the latter is disposed in said slots, and means on the rod for engagement with said ribs to prevent accidental displacement of the hook from the rod.

In testimony whereof I have hereunto set my hand.

MELVILLE R. COLE.

Witnesses:
   CLEM. F. KIMBALL,
   ETHEL HEISLER.